United States Patent

Aoki et al.

Patent Number: 5,979,406
Date of Patent: Nov. 9, 1999

[54] KNOCK CONTROL DEVICE FOR INTERNAL COMBUSTION ENGINE

[75] Inventors: Keiichiro Aoki, Susono; Yasuo Ito, Nagoya, both of Japan

[73] Assignee: Toyota Jidosha Kabushiki Kaisha, Aichi-Ken, Japan

[21] Appl. No.: 09/097,502

[22] Filed: Jun. 15, 1998

[30] Foreign Application Priority Data

Jul. 24, 1997 [JP] Japan .................................. 9-198880

[51] Int. Cl.$^6$ .............................. F02P 5/152; F02P 17/00
[52] U.S. Cl. ................................. 123/406.37; 123/406.33; 73/117.3; 73/35.08
[58] Field of Search ...................... 123/406.37, 406.38, 123/406.21, 406.26, 406.27, 406.29, 406.33; 73/117.3, 35.08, 35.15

[56] References Cited

U.S. PATENT DOCUMENTS

| | | | |
|---|---|---|---|
| 4,444,172 | 4/1984 | Sellmaier et al. | 73/35.08 |
| 5,109,820 | 5/1992 | Iwata et al. | 123/406.37 |
| 5,178,001 | 1/1993 | Ikeuchi et al. | 73/117.3 |
| 5,287,837 | 2/1994 | Hashimoto et al. | 123/406.29 |
| 5,425,339 | 6/1995 | Fukui | 123/406.26 |
| 5,836,285 | 11/1998 | Aoki et al. | 123/406.37 |
| 5,900,536 | 5/1999 | Mogi et al. | 73/35.08 |

FOREIGN PATENT DOCUMENTS

| | | |
|---|---|---|
| 6-159129 | 6/1994 | Japan . |
| 6-299941 | 10/1994 | Japan . |
| 7-286552 | 10/1995 | Japan . |

OTHER PUBLICATIONS

Copending U.S. Appln. Serial No. 08/922,400, filed Sep. 1997.
Copending U.S. Appln. Serial No. 08/932,599, filed Sep. 17, 1997.
Copending U.S. Appln. Serial No. 09/081,477, filed May 19, 1998.

Primary Examiner—Willis R. Wolfe
Assistant Examiner—Hieu T. Vo
Attorney, Agent, or Firm—Kenyon & Kenyon

[57] ABSTRACT

Disclosed is a knock control device for an internal combustion engine wherein, when performing knock control based on an ion current detected using a configuration containing an ignition coil secondary in an ion current path, a knock detection gate period is controlled appropriately in accordance with variation of a mask period in order to ensure complete removal of residual magnetic noise. An ion current output detected through an ion current detection circuit and an inverting amplifier circuit is masked by a mask circuit until a prescribed time elapses after the end of spark discharge, thereby accomplishing complete removal of noise occurring after the end of the discharge. A band-pass filter (BPF) extracts a knock frequency component from the output of the mask circuit, and an integrator circuit integrates the output of the BPF during the gate period. A CPU learns the initiation timing of the gate period in accordance with variation of the end timing of the mask period so that the initiation timing of the gate period occurs later than the end timing of the mask period. As a result, the effects of the noise caused by a signal discontinuity associated with mask removal are eliminated.

3 Claims, 10 Drawing Sheets

Fig.5

MAP OF TGATE [°CA ATDC]

NE [rpm]

| PM [mmHg] | 500 ~1000 | 1000 ~1500 | 1500 ~2000 | --- |
|---|---|---|---|---|
| ~134 | TGATE(11) | TGATE(12) | TGATE(13) | --- |
| 134~291 | TGATE(21) | TGATE(22) | TGATE(23) | --- |
| 291~447 | TGATE(31) | TGATE(32) | TGATE(33) | --- |
| 447~603 | TGATE(41) | TGATE(42) | TGATE(43) | --- |
| 603~759 | TGATE(51) | TGATE(52) | TGATE(53) | --- |

Fig.10

MAP OF KNOCK DETERMINATION COEFFICIENT K1

| NE(rpm) | 1000 | 1500 | 2000 | 2500 | 3000 | --- |
|---|---|---|---|---|---|---|
| K1 | 3.50 | 3.50 | 3.20 | 3.20 | 3.00 | --- |

Fig.11

MAP OF KNOCK DETERMINATION COEFFICIENT K1

TGATE [°CA ATDC]

| NE [rpm] | 1000 | 1500 | 2000 | 2500 | 3000 | --- |
|---|---|---|---|---|---|---|
| 15 | 3.50 | 3.50 | 3.20 | 3.20 | 3.00 | --- |
| 25 | 3.00 | 3.00 | 2.70 | 2.70 | 2.50 | --- |
| 35 | 2.50 | 2.50 | 2.20 | 2.20 | 2.00 | --- |

KNOCK CONTROL DEVICE FOR INTERNAL COMBUSTION ENGINE

BACKGROUND OF THE INVENTION

1. Field of the Invention

The present invention relates to a knock control device for an internal combustion engine and, more particularly, to a device for controlling engine knock based on an ion current inside a combustion chamber.

2. Description of the Related Art

In a gasoline engine, the air/fuel mixture in the vicinity of a spark plug is ignited by the spark produced at the spark plug, and gasoline combustion takes place with the ignited flame propagating throughout the entire air/fuel mixture. One abnormal combustion phenomenon that can occur at this time is knocking. Knocking is a condition in which unburned gases self-ignite before the flame front arrives, due to an abnormally rapid rise in pressure during the flame propagation. When knock occurs, combustion gases oscillate, allowing heat to propagate more freely, and in some cases, engine damage may result. Knocking is closely related to ignition timing; as the ignition timing is advanced, maximum combustion pressure increases, increasing the tendency to knock.

On the other hand, it is desirable to increase the compression ratio in order to increase thermal efficiency and reduce fuel consumption. To achieve this, knock control is performed as part of ignition timing control by advancing the ignition timing up to the point where knock is about to occur while detecting the occurrence of knock. Previously, in this kind of knock detection method, it was common practice to detect knock-induced vibrations using a vibration sensor attached to the cylinder block or a like part, but in recent years, a knock detection method has been proposed that utilizes the change that occurs in an ion current inside a cylinder when knock occurs.

More specifically, when a spark is produced at the spark plug and the air/fuel mixture burns in the combustion chamber, the air/fuel mixture is ionized. When a voltage is applied to the spark plug while the mixture is in the ionized state, an ion current flows. The occurrence of knock can be detected by detecting and analyzing this ion current. Usually, when knock occurs, an oscillating component of 6 kHz to 7 kHz appears in the ion current. The knock detection device based on the ion current extracts this frequency component peculiar to knock by means of a filter, and judges the knocking condition based on the magnitude of that component.

As an example, Japanese Unexamined Patent Publication No. 7-286552 discloses a device in which a capacitor as an ion current generating source is charged to a given voltage by the secondary current that flows when the primary current in the ignition coil is shut off, and an ion current that flows, after a spark discharge, through a closed circuit consisting of the capacitor, the secondary winding of the ignition coil, the spark plug and a current detecting resistor, is measured. In such a device, since the secondary winding of the ignition coil (the secondary coil) is located in the ion current flow path, currents other than the ion current also flow.

More specifically, after the end of the discharge at the spark plug, the ignition coil retains residual magnetic energy, and the ignition coil attempts to release this energy, causing LC resonance by interaction between the inductance L of the coil and the stray capacitance C on the high-voltage line. In this way, after the end of the discharge, an LC resonance current due to the coil's residual magnetic energy flows; since this current has no relevance to the ion current, the LC resonance current causes noise (hereinafter referred to as the residual magnetic noise) in knock detection. To address this problem, the above prior art proposes a method in which an output of an ion current detection circuit is masked starting from prescribed timing before the ignition timing, the residual magnetic noise occurring after the end of the spark discharge is directly detected, and the mask is removed when a prescribed time has elapsed from the time the noise was detected, so that only the ion current can be detected after completely removing the residual magnetic noise.

Here, when the ion current output after masking is supplied to a band-pass filter and the band-pass filter output is supplied to an integrator circuit or a peak-hold circuit to extract the frequency component relating to knock oscillations, the period of the integration or peak holding, that is, the gate period, must be set. Usually, this gate period is set in such a manner as to coincide with the period in which knock-induced oscillations appear. The period in which knock-induced oscillations appear depends on the crankshaft angular position and corresponds, for example, to the position from 15° to 60° CA ATDC (crankshaft angle after top dead center).

When the mask period is provided to remove currents other than the ion current, that is, the residual magnetic noise, and also the gate period is provided during which to perform knock detection, as described above, the following problem will arise. That is, since the spark duration varies due to variations (manufacturing variations, etc.) among systems including the coils, changes over time, etc., mask end timing also varies. Furthermore, at high engine rpm, the interval between the mask end timing and the knock occurrence start timing (15° CA ATDC) becomes shorter than at low engine rpm. Therefore, there can occur cases where the mask period continues partially into the gate period.

The following problem arises when the mask period overlaps into the gate period. That is, frequency components are generated over a wide frequency range in association with a signal discontinuity occurring at the time of mask removal, and some of these frequency components are passed unattenuated through the band-pass filter and introduced into the gate period. If the period containing the mask removal-induced noise overlaps into the knock detection gate period, as just described, the accuracy of knock detection degrades and shifting occurs in the set value of the knock evaluation reference level.

SUMMARY OF THE INVENTION

In view of the above situation, it is an object of the present invention to provide a device for controlling engine knock based on an ion current by employing an ion current detection circuit configured to contain the ignition coil secondary in an ion current path, wherein, to ensure complete removal of the residual magnetic noise, the knock detection gate period is controlled appropriately in accordance with the variation of the mask period and, at the same time, the ignition timing is controlled appropriately in accordance with the control of the gate period.

To achieve the above object, according to a first aspect of the present invention, there is provided a knock control device for an internal combustion engine having an ignition coil, a switching means connected to the primary of the ignition coil for switching a primary current on and off, and a spark plug connected to the secondary of the ignition coil for igniting an air/fuel mixture in a cylinder by a spark discharge triggered by a high voltage induced in the secondary when the primary current is switched off by the switching means, the control device comprising: ion current detection means, forming an ion current path together with the ignition coil secondary and the spark plug, for applying a voltage to the spark plug and for detecting an ion current that flows through the spark plug due to ions generated in the cylinder when the air/fuel mixture burns; mask means for masking an output of the ion current detection means during a mask period in order to remove noise occurring after the end of the discharge, the mask period starting from prescribed timing before initiation of the discharge and lasting until a prescribed time elapses after the end of the discharge; a band-pass filter for extracting a frequency component associated with knock oscillations from an output of the mask means; knock determining means for applying peak-hold processing or integration processing to an output of the band-pass filter during a gate period so set as to contain a period in which the knock oscillations appear, and for determining the presence or absence of knock based on the result of the processing; ignition timing control means for controlling ignition timing in accordance with the presence or absence of knock determined by the knock determining means; and learning means for learning the initiation timing of the gate period in accordance with a variation of the end timing of the mask period so that the initiation timing of the gate period occurs later than the end timing of the mask period.

According to a second aspect of the present invention, preferably, in the knock control device for an internal combustion engine according to the first aspect of the present invention, the learning means is equipped with a guard value for preventing the gate period initiation timing to be learned from being delayed excessively, and the ignition timing means fixes the ignition timing to a predetermined timing if conditions are such that the gate period initiation timing is delayed beyond the guard value by the learning means.

According to a third aspect of the present invention, preferably, in the knock control device for an internal combustion engine according to the first aspect of the present invention, the knock determining means changes a reference value used to determine the presence or absence of knock as the gate period becomes shorter with the initiation timing thereof being delayed through learning by the learning means.

In the thus configured knock control device for an internal combustion engine according to the first aspect of the present invention, the noise occurring after the end of the discharge is completely eliminated by masking the output of the ion current detection means until a prescribed time elapses after the end of the discharge, and the initiation timing of the knock detection gate period is learned in accordance with the variation of the end timing of the mask period so that the initiation timing of the gate period occurs later than the end timing of the mask period. As a result, the effects of the noise caused by a signal discontinuity associated with mask removal are eliminated.

In the device according to the second aspect of the present invention, when conditions are such that the initiation timing of the gate period is excessively delayed, the ignition timing is fixed to a predetermined timing, avoiding the problem that knock control is performed when conditions do not allow knock detection.

In the device according to the third aspect of the present invention, the reference value for determining the presence or absence of knock is changed as the gate period becomes shorter with the initiation timing thereof being delayed. This ensures accurate knock detection at all times.

BRIEF DESCRIPTION OF THE DRAWINGS

Further features and advantages of the present invention will be apparent from the following description with reference to the accompanying drawings, in which:

FIG. 5 is a diagram showing a learning map for determining gate open timing TGATE(n) according to engine operating condition (engine speed NE and intake manifold pressure PM);

FIG. 10 is a diagram showing a map for determining knock determination coefficient K1 according to engine speed NE; and FIG. 11 is a diagram showing a map for determining knock determination coefficient K1 according to engine speed NE and gate open timing TGATE.

DESCRIPTION OF THE PREFERRED EMBODIMENTS

The preferred embodiments of the present invention will be described below with reference to the accompanying drawings.

Figure 1:
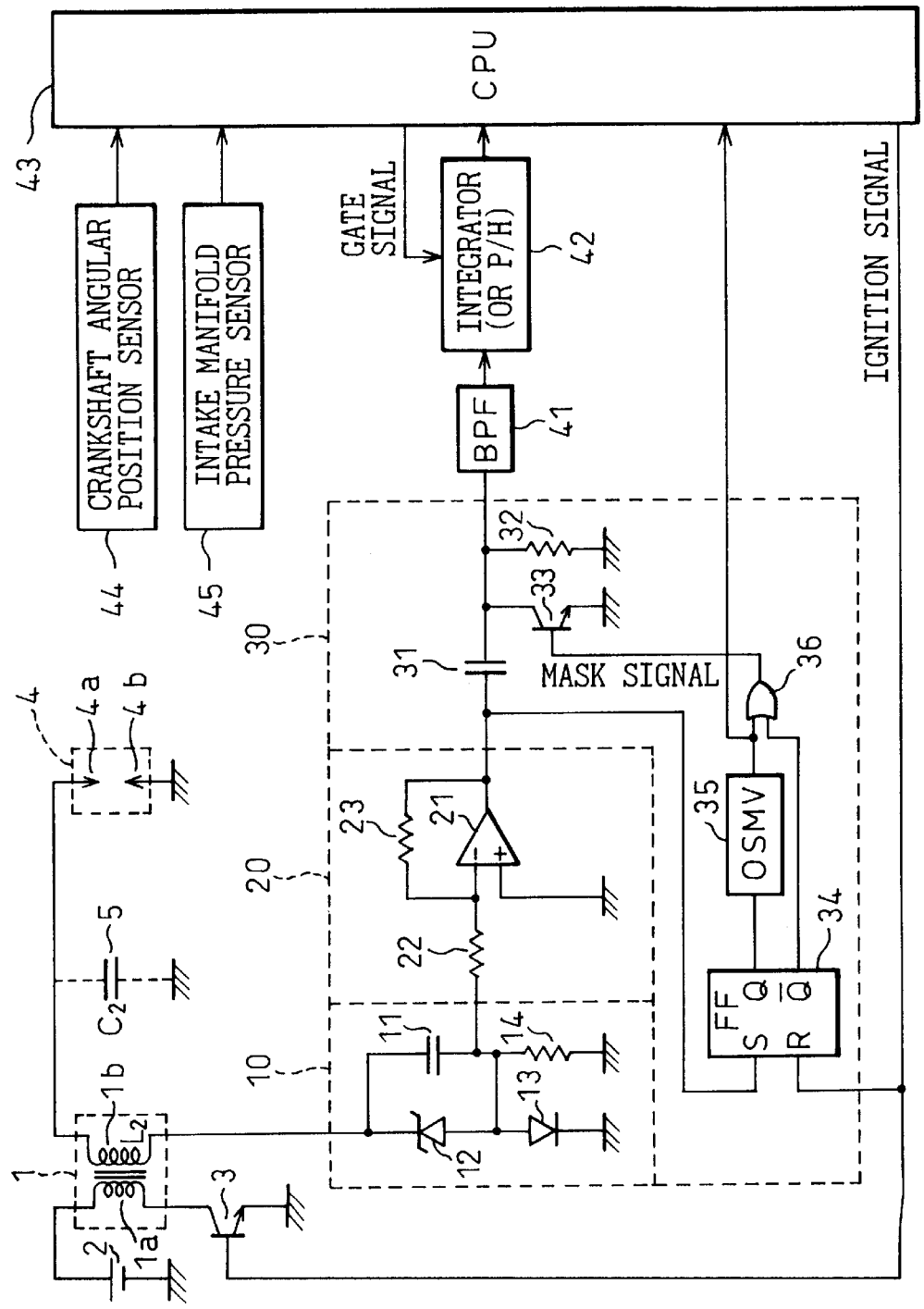
FIG. 1 is a diagram showing the circuit configuration of an ignition device and a knock control device according to one embodiment of the present invention.

FIG. 1 is a diagram showing the circuit configuration of an ignition device and a knock control device according to one embodiment of the present invention. One end of the primary winding 1a of an ignition coil 1 is connected to the positive electrode of a battery 2, and the other end thereof is connected to the collector of a transistor 3 as a switching means. The emitter of the transistor 3 is grounded, and an ignition signal is applied to its base. One end of the secondary winding 1b of the ignition coil 1 is connected to the center electrode 4a of a spark plug 4. The outer electrode 4b of the spark plug 4 is grounded.

An ion current detection circuit 10 is provided at the other end of the secondary winding 1b of the ignition coil 1. A capacitor 11 as an ion current generating source is connected to the secondary winding 1b. Connected in parallel with this capacitor 11 is a voltage-regulator diode (Zener diode) 12 by which the voltage to be charged into the capacitor 11 by the ignition coil secondary current is limited to within a specified value. The other end of the capacitor 11 is grounded via a diode 13 which passes current to the ground, and is also grounded via an ion current detecting resistor 14.

The node between the capacitor 11 and the ion current detecting resistor 14 is connected to an inverting amplifier circuit 20. This inverting amplifier circuit 20 consists of: an operational amplifier 21 whose noninverting input terminal (+ terminal) is grounded, an input resistor 22 connected to the inverting input terminal (− terminal) of the operational amplifier 21, and a feedback resistor 23 connected from the output terminal to the inverting input terminal (− terminal) of the operational amplifier 20.

The output of the inverting amplifier circuit 20 is directed to a mask circuit 30. The function of the mask circuit 30 is to mask the ion current output signal so that the signal is not transmitted to the subsequent stage during a period in which noise occurs. First, the output of the inverting amplifier circuit 20 is coupled to one end of a capacitor 31 that is provided to cut off the DC component contained therein. The other end of the capacitor 31 is connected to ground via a resistor 32 that is provided to obtain an output voltage, and also to the collector of a transistor 33 whose emitter is grounded. A mask signal for specifying the mask period is applied to the base of the transistor 33. The output voltage of the mask circuit 30 is zero during an active period of the mask signal.

A flip-flop (FF) 34, a one-shot multivibrator (OSMV) 35, and an OR gate 36 are provided to create the mask signal. The set input of the FF 34 is connected to the output of the inverting amplifier circuit 20. The reset input of the FF 34 is supplied with the ignition signal. The noninverting output of the FF 34 is coupled to the input of the OSMV 35, while the inverting output thereof is connected to one input of the OR gate 36. The other input of the OR gate 36 is coupled to the output of the OSMV 35. The output of the OSMV 35 is also coupled to a central processing unit (CPU) 43. The CPU 43 is set so that an interrupt occurs at the falling edge of the output of the OSMV 35. The output of the OR gate 36, that is, the mask signal, is coupled to the base of the transistor 33.

The output of the mask circuit 30 is directed to a band-pass filter (BPF) 41. The BPF 41 takes the output signal of the mask circuit 30 and extracts from it the frequency component relating to the knock oscillations, that is, the frequency component near 6 kHz to 7 kHz. Following the BPF 41 is an integrator circuit 42 which integrates the output signal of the BPF 41 during an active period of a gate signal that is supplied from the CPU 43. A peak-hold (P/H) circuit may be provided in place of the integrator circuit.

The central processing unit (CPU) 43 performs ignition timing control including knock control. The CPU 43 converts an analog output voltage from the integrator circuit 42 into a digital output voltage, and determines that knock has occurred when the value of the output voltage exceeds a predetermined reference value. Then, based on outputs from various sensors including a crankshaft angular position sensor 44 and an intake manifold pressure sensor 45, the CPU 43 detects engine operating conditions, comprehensively judges the engine condition as well as the presence or absence of knock, determines optimum ignition timing, and outputs the ignition signal. The CPU 43 also determines the gate period for the integrator circuit 42 and supplies the gate signal to the integrator circuit 42.

Figure 2:
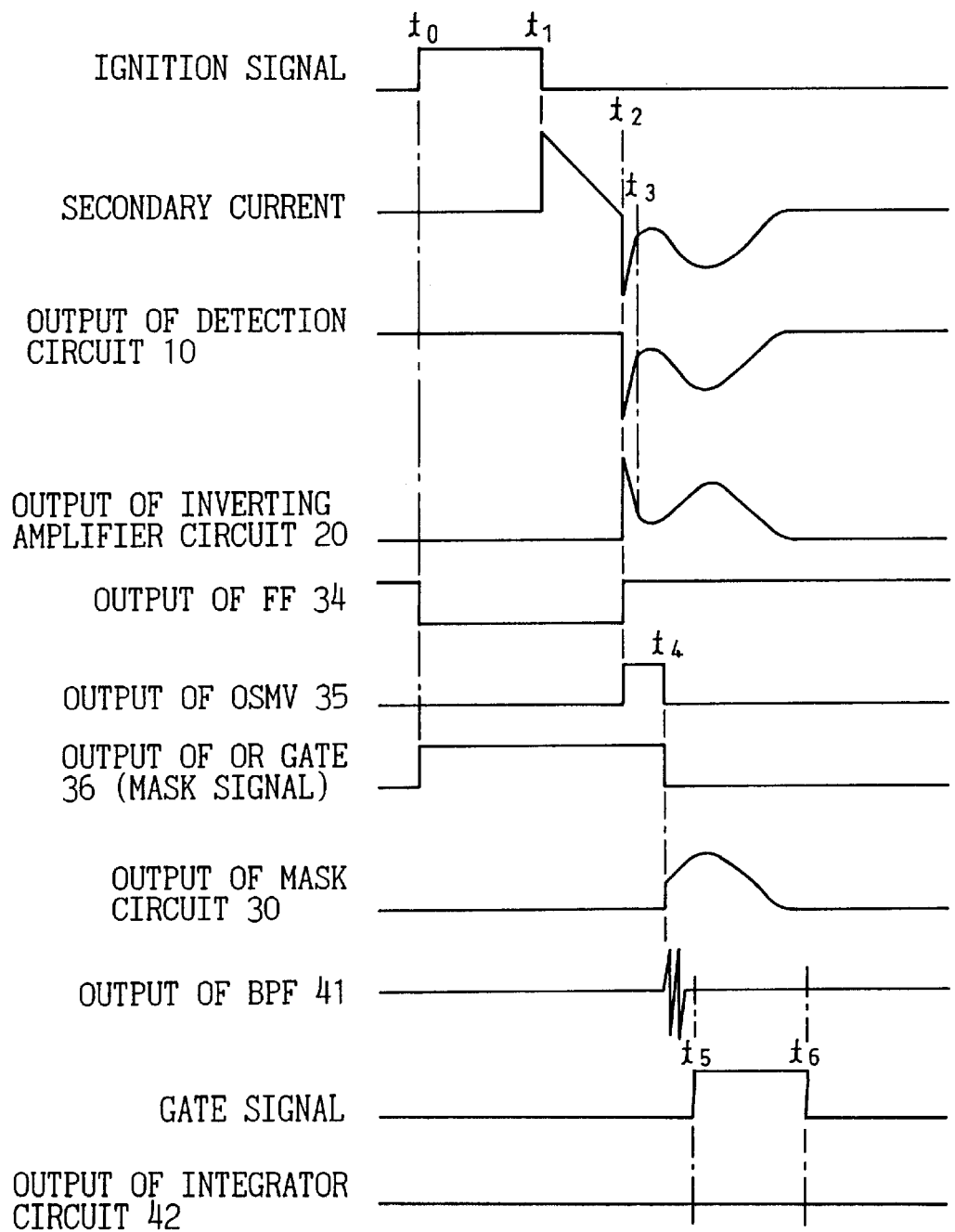
FIG. 2 is a timing chart of various signals for explaining knock detection processing in the circuit configuration of FIG. 1, showing the case in which it is determined that there is no knock.
Figure 3:
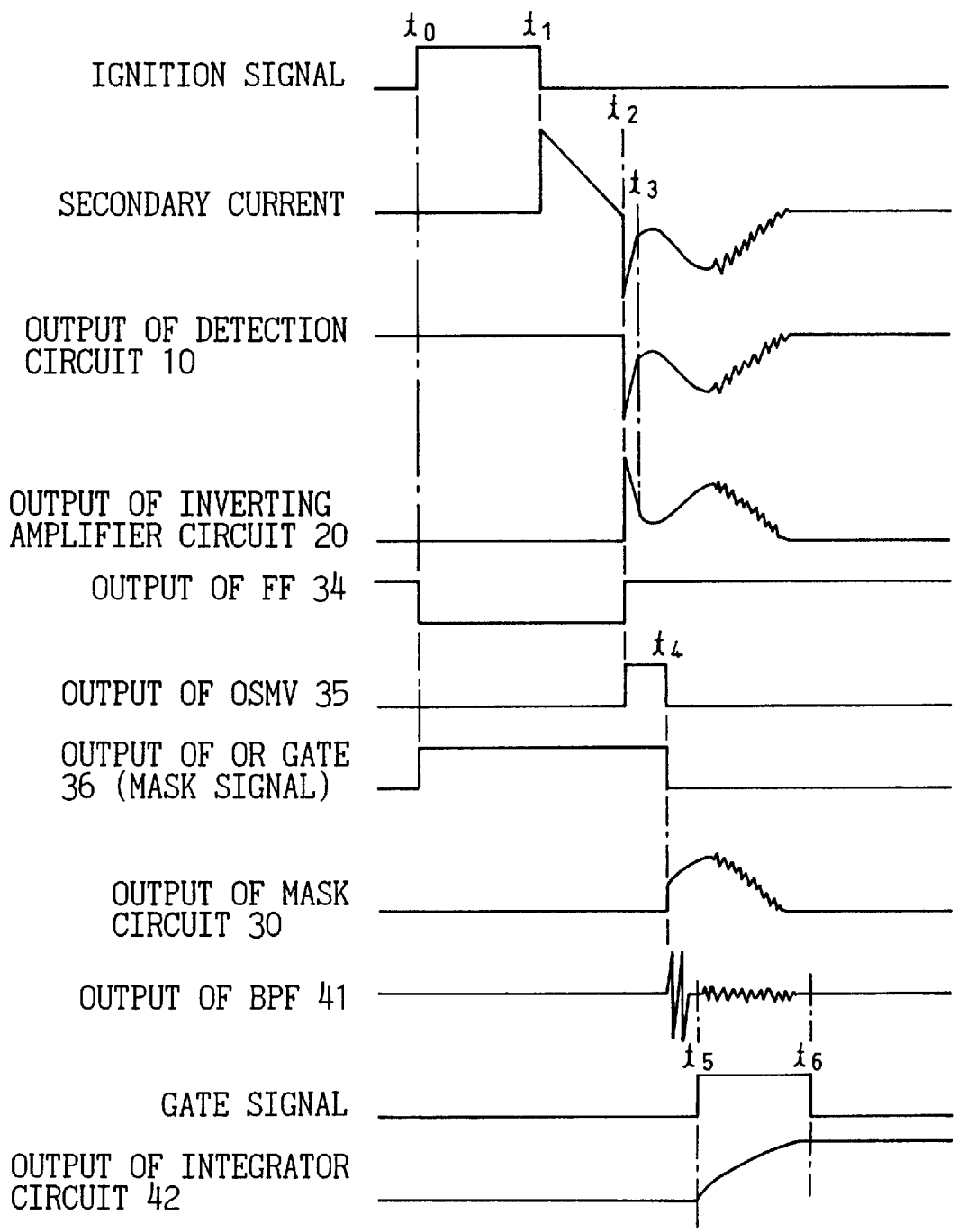
FIG. 3 is a timing chart of the various signals for explaining knock detection processing in the circuit configuration of FIG. 1, showing the case in which it is determined that there is knock.

FIGS. 2 and 3 are timing charts of the various signals for explaining the knock detection processing performed in the device of FIG. 1. FIG. 2 shows the case in which it is determined that there is no knock, and FIG. 3 shows the case in which it is determined that there is knock. First, when the ignition signal goes high and the transistor 3 is turned on at timing to, a current flows through the ignition coil primary winding 1a. Also at timing to, the FF 34 is reset by the ignition signal and the output of the OR gate 36 goes high by the inverting output of the FF 34.

Next, when the ignition signal is set low and the transistor 3 is turned off at timing $t_1$, the primary current is switched off, inducing a high voltage in the secondary winding 1b of the ignition coil 1 and thereby producing a spark at the spark plug 4. That is, when a high negative voltage is applied to the center electrode 4a of the spark plug 4, a spark discharge occurs between the center electrode 4a and the outer electrode (ground electrode) 4b and, during the period from $t_1$ to $t_2$, the secondary current flows from the secondary winding 1b of the ignition coil, the current flowing back to the secondary winding 1b through the capacitor 11, the voltage-regulator diode 12, the diode 13, and the spark plug 4. During this process, the capacitor 11 is charged to a voltage equal to the Zener voltage (about 100 volts) of the voltage-regulator diode 12.

At the end of the discharge, that is, at timing $t_2$, the ignition coil attempts to release residual magnetic energy, as a result of which LC resonance occurs between the inductance $L_2$ of the ignition coil secondary winding 1b and the stray capacitance $C_2$ (indicated by reference numeral 5 in FIG. 1) formed in the high voltage line, and an LC resonance current flows. Since this LC resonance current flows through the ion current detecting resistor 14, an abrupt change appears in the output waveforms of the ion current detection circuit 10 and the inverting amplifier circuit 20 after the end of the discharge, but this change is not due to the ion current, but represents the residual magnetic noise (LC resonance noise). Also at timing $t_2$, the FF 34 is set by the output of the inverting amplifier circuit 20, causing the OSMV 35 to output a high signal for a known period of time, that is, from timing $t_2$ to timing $t_4$. As a result, the output of the OR gate 36 is held high from timing to until timing $t_4$. Here, the known period of time, $t_4-t_2$, is set longer than the duration of the residual magnetic noise, the timing $t_4$ occurring later than the timing $t_3$ at which the LC resonance current flow ends.

Then, after timing $t_3$, that is, after the residual magnetic noise, or the LC resonance current flow due to the residual magnetic energy, ends, the ion current flows. More specifically, when the air/fuel mixture inside the combustion chamber is burned by being ignited by the spark at the spark plug 4, the air/fuel mixture is ionized. When the mixture is in the ionized state, conductivity is maintained across the gap between the two electrodes of the spark plug 4. Furthermore, a voltage is applied between the two electrodes of the spark plug 4 by the charge voltage of the capacitor 11, and therefore, the ion current flows. This ion current flows from one end of the capacitor 11 and back to the other end thereof passing through the ignition coil secondary winding 1b, the spark plug 4, and the ion current detecting resistor 14. Then a voltage equal to −(ion current value)×detecting resistor value appears at the node between the ion current detecting resistor 14 and the capacitor 11, and this voltage is inverted and amplified by the inverting amplifier circuit 20. The output of the inverting amplifier circuit 20 is supplied to the mask circuit 30.

Then, at timing $t_4$ after timing $t_3$, the output of the OR gate 36, that is, the mask signal, is set inactive, and the mask is thus removed, as previously described. As a result, the output of the mask circuit 30 changes discontinuously at mask removal timing $t_4$. Since this steplike signal change has frequency components over a wide frequency range, some of the frequency components are passed unattenuated through the BPF 41 at the subsequent stage, and these frequency components cause noise.

The ion current signal is an undulating low-frequency signal synchronized to the cylinder pressure. When knock occurs, oscillations associated with the knock are superimposed, as shown in FIG. 3, on the wave portion after the crest of the wave, that is, after the maximum cylinder pressure (usually, at or near 15° CA ATDC) is reached. The period in which the knock-associated oscillations appear remains relatively constant in terms of crankshaft angle regardless of engine rpm, and corresponds substantially to the crankshaft angular position from 15° to 60° CA ATDC. Therefore, the gate period from timing $t_5$ to timing $t_6$, which is specified by the gate signal supplied from the CPU 43 to the integrator circuit 42, must be set by avoiding the period of the noise occurring at the time of mask removal and also by considering the duration of the knock oscillations. The setting of the gate period will be described in detail later.

Assuming that the gate period is set properly, when there is no knock, the output of the BPF 41 remains at a low level throughout the gate period, and the output of the integrator circuit 42 also remains small, as shown in FIG. 2. On the other hand, when there is knock, the output of the BPF 41 has a high level in the gate period, and the output of the integrator circuit 42 increases, as shown in FIG. 3. The CPU 43 determines the presence or absence of knock by comparing the output of the integrator circuit 42 with a predetermined reference value.

Figure 4:
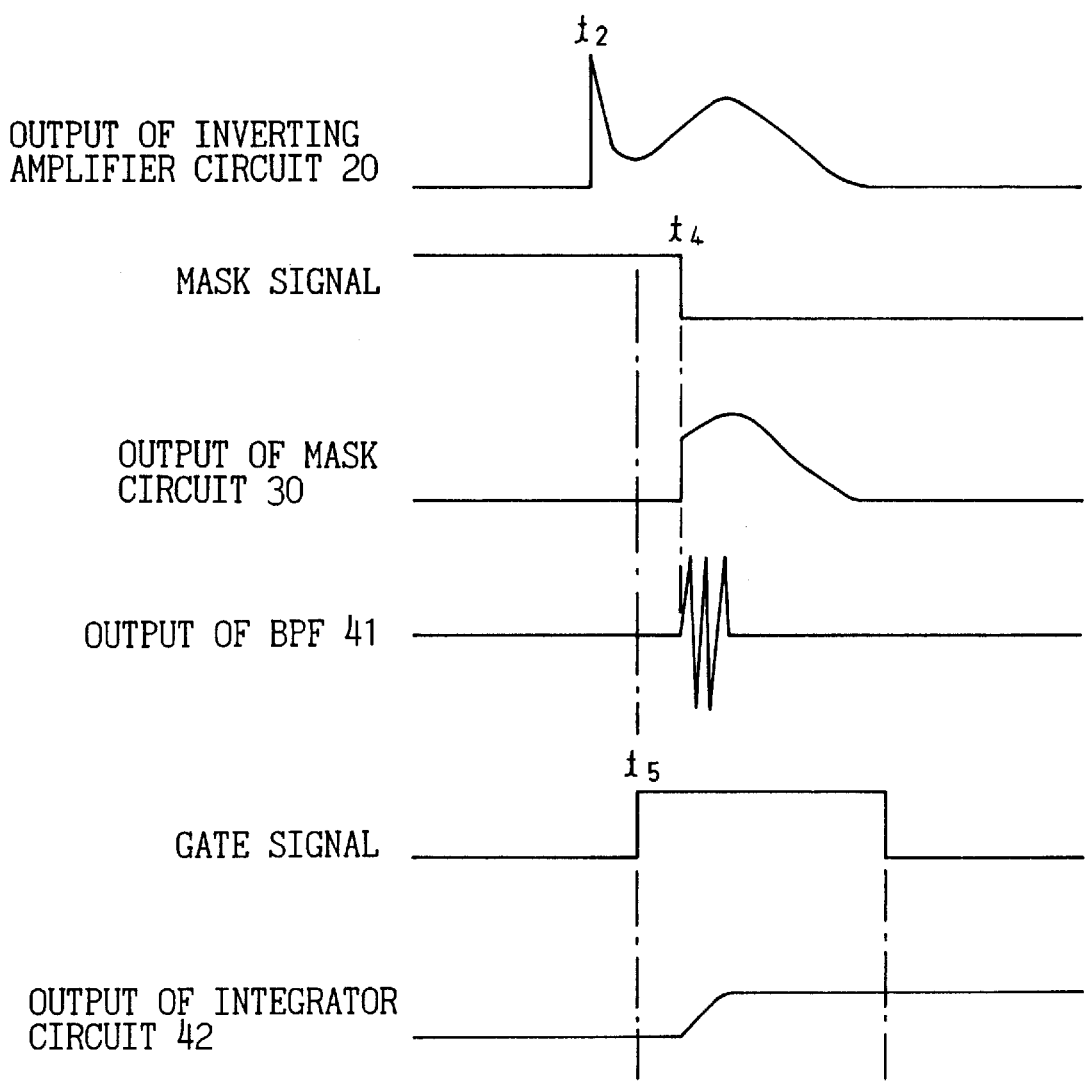
FIG. 4 is a timing chart of the various signals for explaining the problem that would occur when a gate period was set without considering the variation of a mask period.

FIG. 4 is a timing chart of the various signals for explaining the problem that would occur when the gate period was set without considering the variation of the mask period. As previously described, the mask end timing varies due to variations in the spark duration, and furthermore, the interval between the mask end timing and the knock occurrence start timing becomes shorter as engine speed increases. Therefore, there can occur cases where the mask period continues partially into the gate period. As noted earlier, the output of the mask circuit 30 exhibits a steplike change at the mask removal timing $t_4$. Since the signal changing in a steplike manner contains frequency components over a wide frequency range, some of the components are passed unattenuated through the BPF 41. If the gate period start timing, that is, the gate open timing $t_5$, occurs earlier than the mask period end timing, that is, the mask removal timing $t_4$, there occurs the possibility of making an erroneous decision since the noise component is also integrated, and it will becomes necessary to change the knock determination reference level.

To address this, provisions are made in the present invention to learn the gate period start timing, i.e., the gate open timing, in accordance with the variation of the mask period end timing, i.e., the mask removal timing. More specifically, the CPU 43 has a map of gate open timing TGATE(n) versus engine operating condition (n), such as the one shown in FIG. 5, and learns its contents. The engine operating condition here is based on the engine speed NE detected by the crankshaft angular position sensor 44 and the intake manifold pressure PM detected as engine load by the intake manifold pressure sensor 45. TGATE(n) is a numeric value expressed in degrees of crankshaft angle after compression top dead center.

Figure 6:
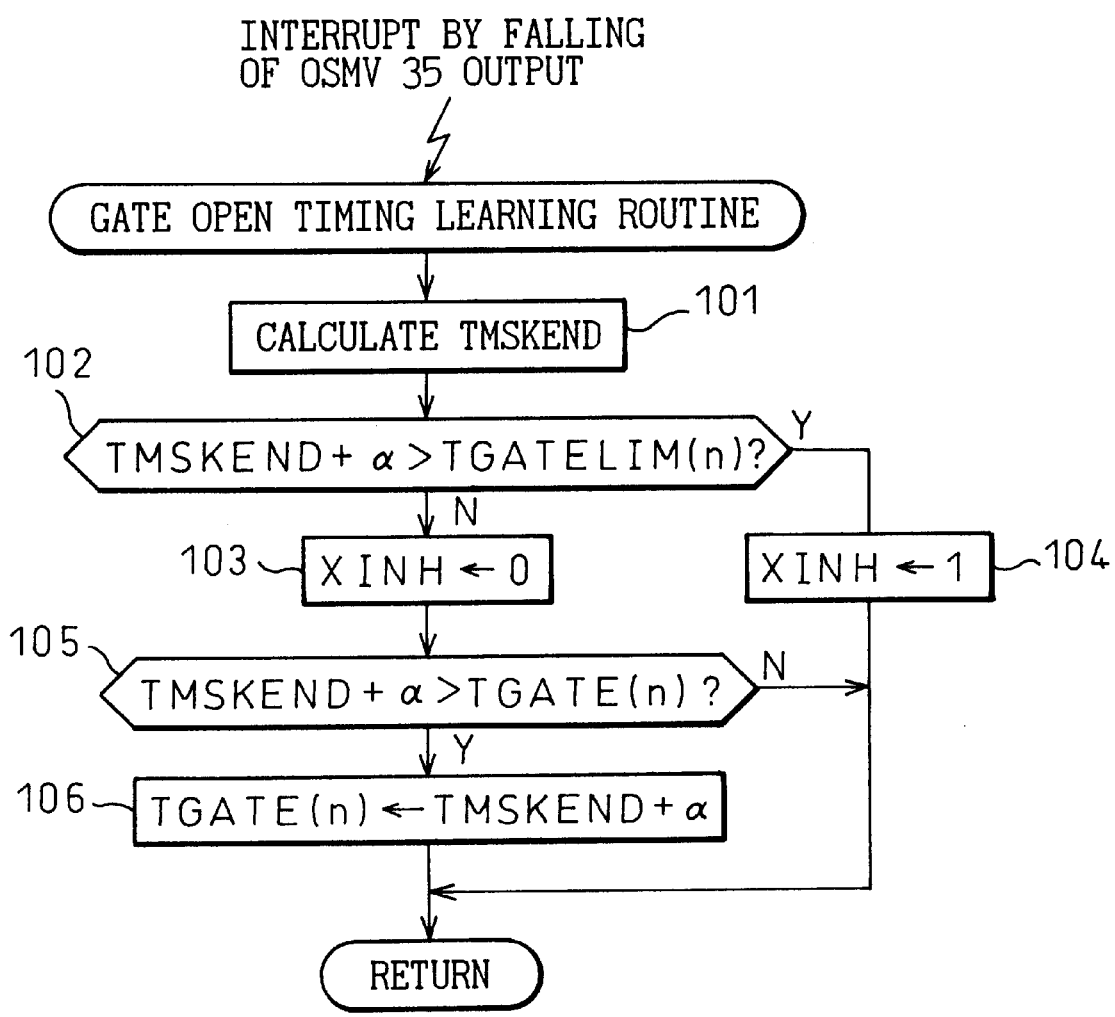
FIG. 6 is a flowchart illustrating a processing sequence for a gate open timing learning routine according to one embodiment of the present invention.
Figure 7:
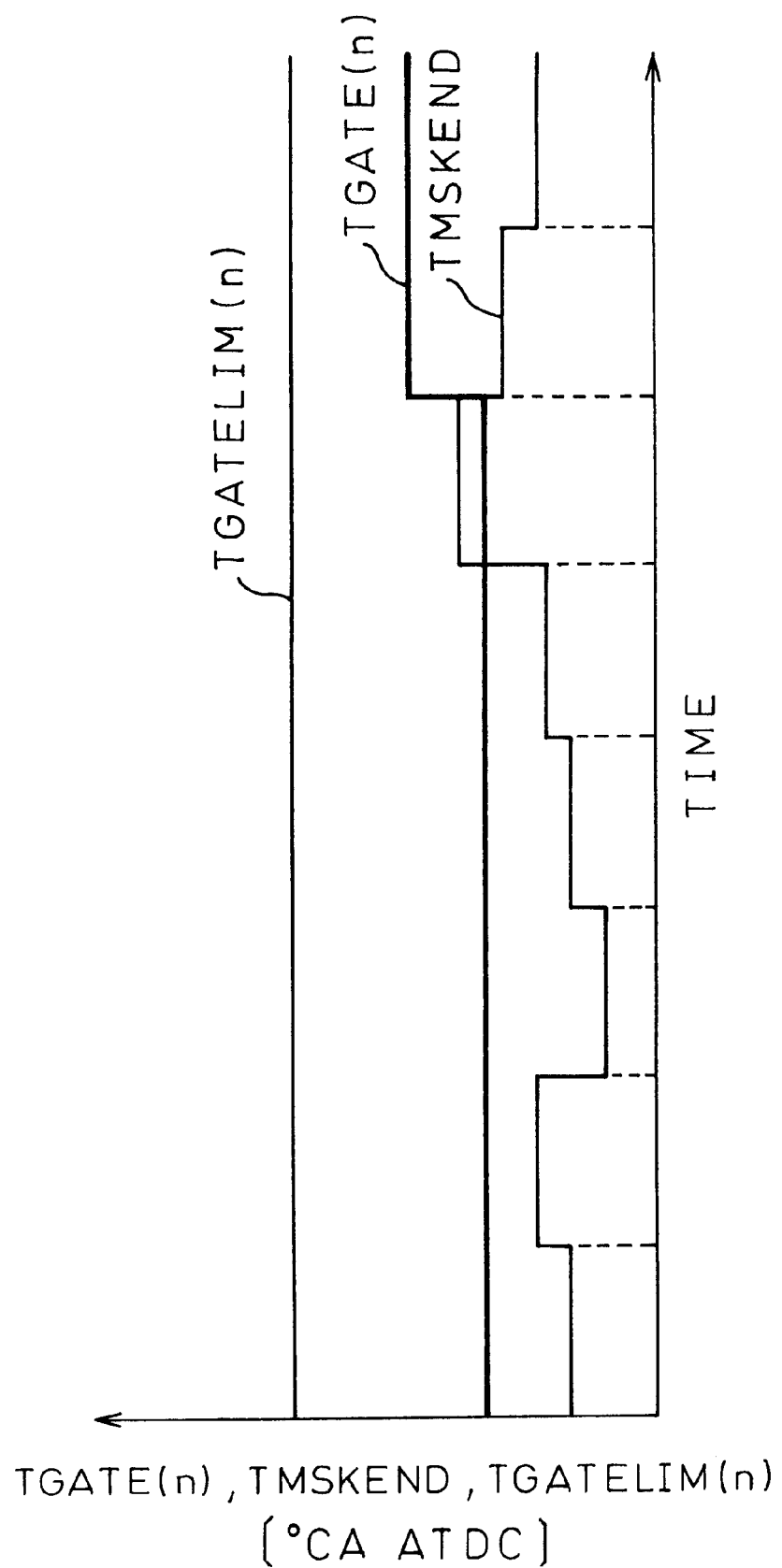
FIG. 7 is a timing chart illustrating how the gate open timing TGATE(n) for the operating condition n is being updated in accordance with the learning process in the gate open timing learning routine.

FIG. 6 is a flowchart illustrating a processing sequence for a gate open timing learning routine according to one embodiment of the present invention. FIG. 7 is a timing chart illustrating how the gate open timing is being updated in accordance with the learning process shown in FIG. 6. This routine is invoked by an interrupt occurring at the falling edge of the output signal of the OSMV 35. First, in step 101, the present crankshaft angular position is calculated based on the output of the crankshaft angular position sensor 44. Since this routine is invoked at $t_4$ (see FIGS. 2 and 3) when the output signal of the OSMV 35 falls, the detected crankshaft angular position represents the mask end timing TMSKEND.

Next, in step 102, TMSKEND+α is compared with TGATELIM(n). Here, α is a margin (including delay time) that must be allowed between the mask end timing and the gate open timing, and TGATELIM(n) is a limit value, stored as a map, that indicates the limit time, in terms of crankshaft angular position, by which time the gate must be opened in order to perform knock detection under the operating condition n. If TMSKEND+α>TGATELIM(n), that is, if knock detection is expected to become impossible if the gate open timing is set later than the mask end timing, the process proceeds to step 104 where knock control inhibit flag XINH is set to 1, and the routine is terminated. On the other hand, if TMSKEND+α≦TGATELIM(n), that is, if the gate open timing can be set later than the mask end timing without rendering knock detection impossible, then the process proceeds to step 103 where the knock control inhibit flag XINH is cleared to 0. It will, however, be noted that the steps 102, 103, and 104 are not absolutely mandatory here.

At step 105, which is performed following step 103, TMSKEND+α is compared with TGATE(n). Here, TGATE(n) is a learned value, given from the map of FIG. 5, that represents the gate open timing for knock detection under the present operating condition n. If TMSKEND+α≦TGATE(n), that is, if the required gate open timing determined based on the mask end timing in the present cycle is earlier than the already learned gate open timing, the routine is terminated. On the other hand, if TMSKEND+α>TGATE(n), that is, if the required gate open timing determined based on the mask end timing in the present cycle is later than the already learned gate open timing, then the process proceeds to step 106 where the contents of TGATE(n) in the map are updated by the value of TMSKEND+α, after which the routine is terminated. As this routine is run, the map value TGATE(n) is updated as illustrated in FIG. 7.

Figure 8:
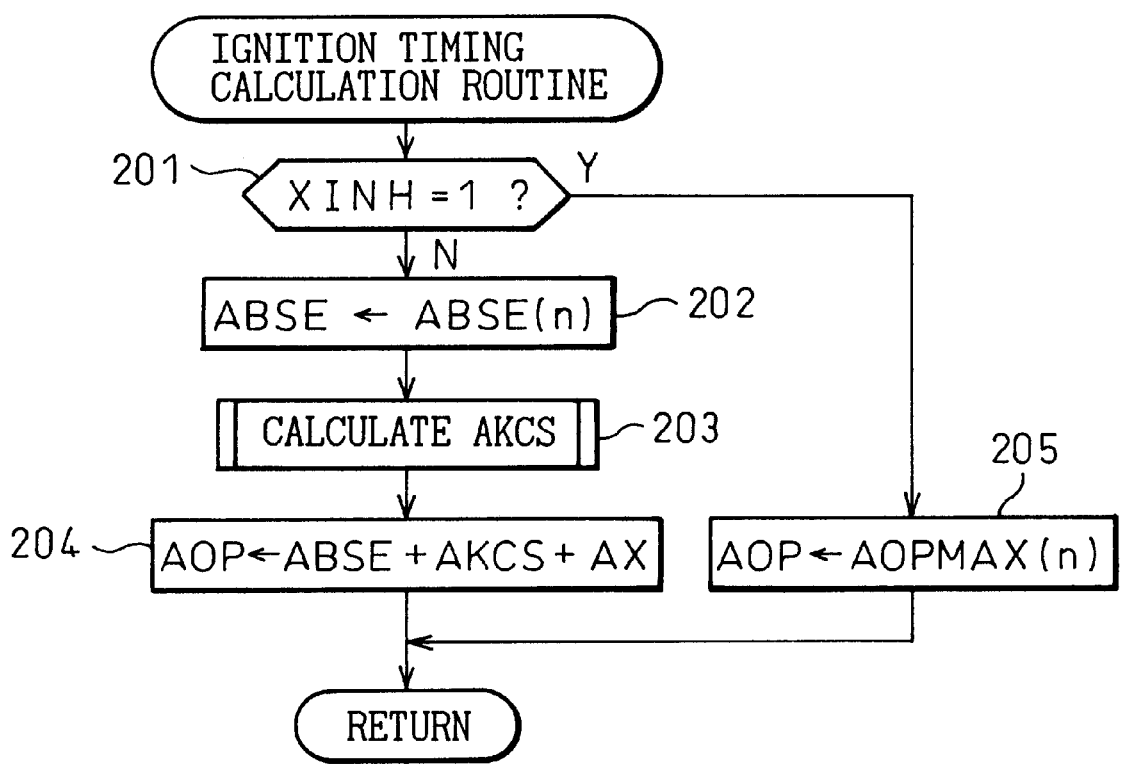
FIG. 8 is a flowchart illustrating a processing sequence for an ignition timing calculation routine according to one embodiment of the present invention.

FIG. 8 is a flowchart illustrating a processing sequence for an ignition timing calculation routine according to one embodiment of the present invention. This routine is executed for every predetermined crankshaft angle. The ignition timing is obtained as the crankshaft angular position before top dead center. First, in step 201, the knock control inhibit flag XINH set or reset in the gate open timing learning routine is tested. If XINH=1, that is, if knock control is inhibited, the process proceeds to step 205 where final ignition timing AOP is substituted for the value AOPMAX(n) stored in a prescribed map as a fixed ignition timing that can securely prevent the occurrence of knocking under the present operating condition n. After that, the routine is terminated.

On the other hand, if XINH=0, that is, if knock control is not inhibited, steps 202, 203, and 204 are carried out. In step 202, basic ignition timing ABSE is substituted for the value ABSE(n) stored in a prescribed map as a basic ignition timing under the present operating condition n. Next, in step 203, knock control correction amount AKCS is calculated by executing the knock control (AKCS calculation) routine described later. Then, in step 204, the final ignition timing AOP is calculated by $$AOP \leftarrow ABSE+AKCS+AX$$

where AX is a correction amount other than the knock control correction amount.

Figure 9:
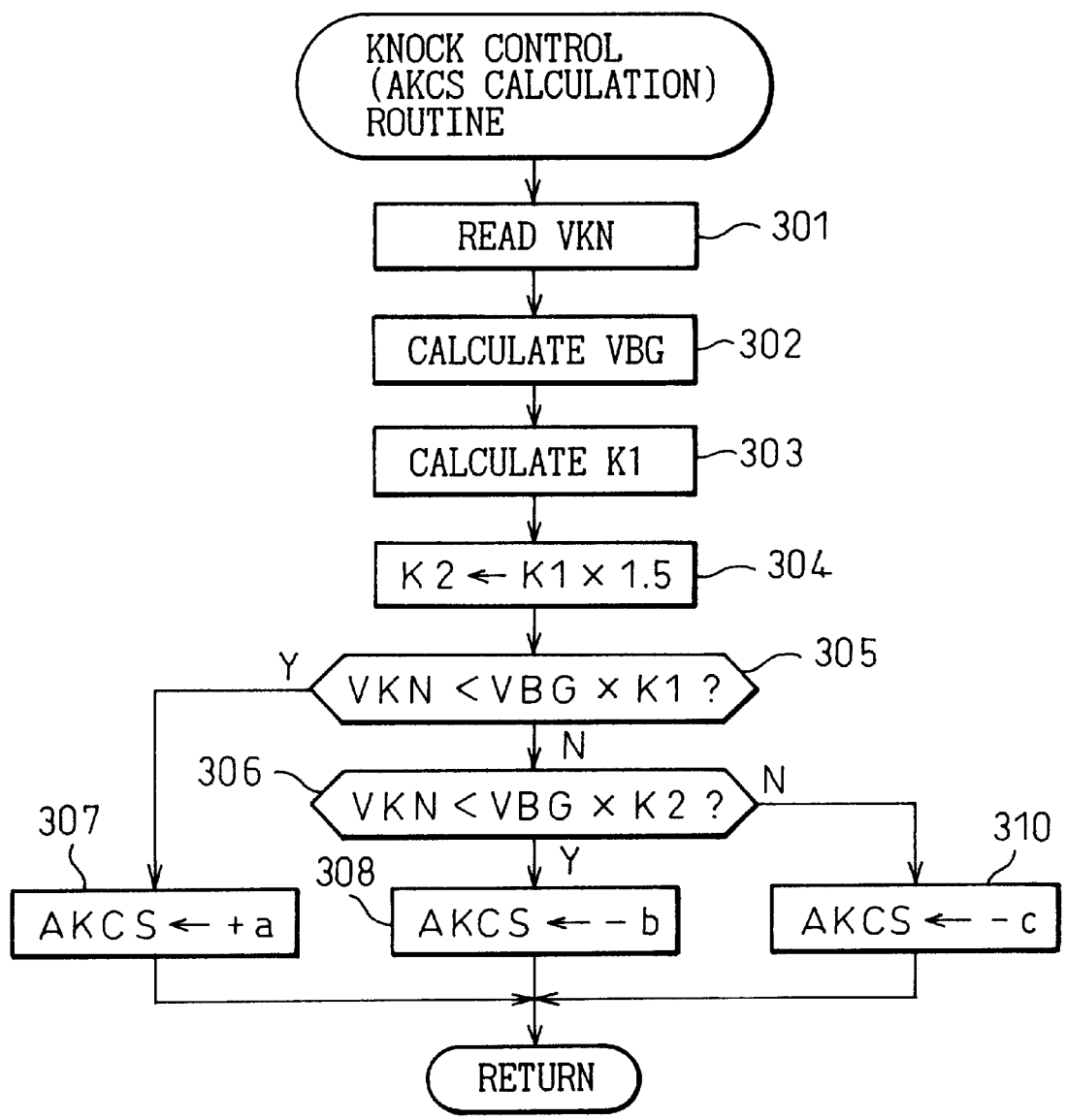
FIG. 9 is a flowchart illustrating a processing sequence for a knock control (AKCS calculation) routine according to one embodiment of the present invention.

FIG. 9 is a flowchart illustrating a processing sequence for the knock control (AKCS calculation) routine executed in step 203 in the ignition timing calculation routine. First, in step 301, the output voltage of the integrator circuit 42 is input and A/D converted to obtain integrated value VKN. Next, in step 302, background VBG is calculated as the usual level that should be considered in performing knock detection. This VBG may be either a mean, median, or variation value based on the previously calculated VKNs. Then, in step 303, based on the present engine speed NE an interpolation calculation is performed, by referring to the map such as shown in FIG. 10, to calculate a first knock determination coefficient K1. Next, in step 304, K1 is multiplied by 1.5 to obtain a second knock determination coefficient K2.

In steps 305 and 306, the presence or absence of knock is determined based on the values of VKN, VBG, K1 and K2. More specifically, when VKN<VBG×K1, it is determined that there is no knock. On the other hand, if the relation VBG×K1<VKN<VBG×K2 holds, it is determined that a low level of knock is occurring. Further, if VBG×K2<VKN, it is determined that a high level of knock is occurring. In steps 307, 308, and 309, the knock control correction amount AKCS for the ignition timing is determined in the following manner in accordance with the result of the knock detection.

That is, when no knock is detected, AKCS is set to +a (0<a) to advance the ignition timing. When a low level of knock is occurring, AKCS is set to −b (0<b) to retard the ignition timing to some degree. When a high level of knock is occurring, AKCS is set to −c (b<c) to retard the ignition timing considerably. The knock control correction amount AKCS thus obtained is used in step 204 in the ignition timing calculation routine.

Here, the knock detection gate period set in the above control process may become displaced from the initially set map value because of various variation factors. If this happens, the knock determination coefficient K1 shown in FIG. 10 may also deviate from its initial set value. To compensate for such a variation, if the knock determination coefficient for the present engine operating condition can be set to an optimum value that matches the gate open timing which is being updated by learning, knock control with higher accuracy can be achieved. For this purpose, it is preferable to provide a map such as shown in FIG. 11 instead of the map shown in FIG. 10 and to change the knock determination coefficient in accordance with the engine speed NE and the gate open timing GATE.

As described above, according to the present invention, in a device for controlling engine knock based on the ion current by employing the ion current detection circuit configured to contain the ignition coil secondary in the ion current path, to ensure complete removal of the residual magnetic noise the knock detection gate period is controlled appropriately in accordance with the variation of the mask period and, at the same time, the ignition timing is controlled appropriately in accordance with the variation of the gate period.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A knock control device for an internal combustion engine having an ignition coil, a switching means connected to the primary of said ignition coil for switching a primary current on and off, and a spark plug connected to the secondary of said ignition coil for igniting an air/fuel mixture in a cylinder by a spark discharge triggered by a high voltage induced in the secondary when said primary current is switched off by said switching means, said control device comprising:

ion current detection means, forming an ion current path together with said ignition coil secondary and said spark plug, for applying a voltage to said spark plug and for detecting an ion current that flows through said spark plug due to ions generated in said cylinder when said air/fuel mixture burns;

mask means for masking an output of said ion current detection means during a mask period in order to remove noise occurring after the end of said discharge, said mask period starting from prescribed timing before initiation of said discharge and lasting until a prescribed time elapses after the end of said discharge;

a band-pass filter for extracting a frequency component associated with knock oscillations from an output of said mask means;

knock determining means for applying peak-hold processing or integration processing to an output of said band-pass filter during a gate period so set as to contain a period in which said knock oscillations appear, and for determining the presence or absence of knock based on the result of said processing;

ignition timing control means for controlling ignition timing in accordance with the presence or absence of knock determined by said knock determining means; and learning means for learning initiation timing of said gate period in accordance with a variation of end timing of said mask period so that the initiation timing of said gate period occurs later than the end timing of said mask period.

2. The device according to claim 1, wherein said learning means is equipped with a guard value for preventing said gate period initiation timing to be learned from being delayed excessively, and said ignition timing means fixes said ignition timing to predetermined timing if conditions are such that said gate period initiation timing is delayed beyond said guard value by said learning means.

3. The device according to claim 1, wherein said knock determining means changes a reference value used to determine the presence or absence of knock as said gate period becomes shorter with the initiation timing thereof being delayed through learning by said learning means.

\* \* \* \* \*